US008175946B2

(12) United States Patent
Hamati et al.

(10) Patent No.: US 8,175,946 B2
(45) Date of Patent: May 8, 2012

(54) SYSTEM AND METHOD FOR PROVIDING THE EXECUTION PROBABILITY OF A LIMIT ORDER

(75) Inventors: Gheis Henri Hamati, Princeton, NJ (US); Yan Zeng, Cambridge, MA (US)

(73) Assignee: Bloomberg Finance L.P., New York, NY (US)

( * ) Notice: Subject to any disclaimer, the term of this patent is extended or adjusted under 35 U.S.C. 154(b) by 666 days.

(21) Appl. No.: 12/110,105

(22) Filed: Apr. 25, 2008

(65) Prior Publication Data
US 2009/0271330 A1 Oct. 29, 2009

(51) Int. Cl.
*G06Q 40/00* (2006.01)
(52) U.S. Cl. ............. 705/36 R; 705/37; 705/10; 705/51
(58) Field of Classification Search ................ 705/1, 36, 705/1.1, 36 R, 37, 10, 51, 35; 713/324, 300; 712/240, 207; 711/136, 128; 375/240, 340
See application file for complete search history.

(56) References Cited

U.S. PATENT DOCUMENTS

| | | | |
|---|---|---|---|
| 6,343,278 B1 | 1/2002 | Jain et al. | |
| 6,493,682 B1 * | 12/2002 | Horrigan et al. | 705/36 R |
| 7,177,833 B1 * | 2/2007 | Marynowski et al. | 705/38 |
| 7,251,629 B1 | 7/2007 | Marynowski et al. | |
| 2003/0182224 A1 | 9/2003 | Horrigan et al. | |
| 2006/0259381 A1 | 11/2006 | Gershon | |
| 2007/0100722 A1 * | 5/2007 | Ferguson et al. | 705/36 R |
| 2007/0233593 A1 | 10/2007 | Claus et al. | |
| 2007/0294162 A1 * | 12/2007 | Borkovec | 705/37 |
| 2008/0077521 A1 * | 3/2008 | Sibley et al. | 705/37 |

FOREIGN PATENT DOCUMENTS

| | | |
|---|---|---|
| JP | 2006-189995 | 7/2006 |
| WO | WO 01/09698 | 2/2001 |
| WO | WO 01/09699 | 2/2001 |
| WO | WO 01/09700 | 2/2001 |

OTHER PUBLICATIONS

"Rediscovering the Value of Intellectual Property Rights: How Brazil's Recognition and Protection of Foreign IPRs Can Stimulate Domestic Innovation and Generate Exonomic Growth"—Lawrence A. Kogan—International Journal of Economic Development—pp. 15-678—2006.*

* cited by examiner

*Primary Examiner* — Shahid Merchant
*Assistant Examiner* — John H Holly
(74) *Attorney, Agent, or Firm* — Frank J. DeRosa; Brian Goncalves; Frommer Lawrence & Haug LLP

(57) ABSTRACT

A system, method and computer program product are described for providing the execution probability of a limit order within a given time period based on historical and current information and for adaptively and dynamically adjusting to intra-day trade data. For a given financial interest, the frequency of trade execution, the time evolution of the price, the time evolution of the trade volume, and the current state of the market, among other parameters, are captured and/or calculated. A probability function is generated based on the parameters corresponding to various time spans, and the execution probability of a limit order within a given time period is provided. Embodiments of the invention can be employed to estimate the probability of a limit order being executed within a given time period in the future, e.g., the next two minutes, based on the parameter data of a given time period in the past, e.g., the previous five minutes.

34 Claims, 3 Drawing Sheets

SYSTEM AND METHOD FOR PROVIDING THE EXECUTION PROBABILITY OF A LIMIT ORDER

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF THE INVENTION

The present invention relates generally to the field of trade execution and more particularly to providing an execution probability of a limit order of a given financial asset (hereinafter a "security" or a "stock") or a given real asset or commodity, including those represented by a yellow key on a Bloomberg Professional® Service keyboard. Systems and methods known in the prior art for providing the execution probability of a limit order are based on, for example, econometric modeling, which directly models or tests execution probabilities, or models which directly model limit order book data. Such systems and methods are static and non-adaptive. The inventors do not believe such models to have achieved practical success.

SUMMARY OF THE INVENTION

Embodiments of the present invention provide a system, method, and computer program product useful in providing an execution probability of a limit order of a given security during a given time period.

Embodiments of the invention calculate the execution probability based on past or historical trade data, including past dynamics which may be predictive in nature. According to the embodiments of the invention, past parameters may include one or more of: times of executions of trades in the security over a given past time period (e.g., based on time stamps); executed volumes of trades in the security over a given past time period, prices of executed trades in the security over a given past time period. An execution probability is provided based on one or more of such parameters and current market state data, e.g., best ask price (for a buy order) or the best bid price (for a sell order).

Embodiments of the invention provide an execution probability based on a dynamic and adaptive model which, conditional on current market data, infers execution probability from an evolution model of a price-volume pair representing a bargaining process and its corresponding output process.

According to embodiments of the invention, observations of trade data for a given security are captured, e.g., some or all of the parameters identified above. According to embodiments of the invention, calculations are made of one or more of the frequency of trade execution, the time evolution of the stock price, and the time evolution of the trade volume. According to embodiments of the invention, a probability function is generated based on the some or all of the above parameters corresponding to various time spans and the execution probability of a limit order within a given time period is provided.

Embodiments of the invention provide execution probability of a limit order for at least one financial interest implemented by a computer system comprising at least one computer and a database comprising financial trade data of at least one financial interest. The at least one computer calculates dynamics in past trading of the at least one interest based on one or more of prices of past executed trades of the at least one interest, volumes of past executed trades of the at least one interest, and frequency of execution of past trades of the at least one interest. The at least one computer provides an execution probability within a given future time period of a limit order of the at least one financial interest based on the calculated past trading dynamics and a current market state of the at least one financial interest.

In one embodiment, the present invention can be employed to estimate the probability of a limit order being executed within a given time period in the future, e.g., the next two minutes, based on the trade data of a given time period in the past, e.g., the previous five minutes. This set of parameters captures the market movement over a short time period resulting in an adaptive and dynamic system and method of providing an execution probability. Such a system and method are highly beneficial when considering high levels of intraday volatility, e.g., the market reaction to a press release.

In an embodiment, the system and method for providing the execution probability of a limit order of at least one security comprises at least one computer, at least one database comprising financial trade data of the security, and programming stored on a computer readable medium or media. When executed, the programming causes the computer to calculate a frequency of trade execution of the security, calculate a price movement of the security, calculate a distribution of trade volumes of the security, and determine a current market state of the security. Further, the program calculates an execution probability of a limit order of the security within a given time period based on the calculated frequency of trade execution, the calculated price movement, the calculated distribution of trade volumes, and the determined current market state. In an embodiment, the trade data comprises one or more of trade price, trade volume, trade timestamp, last bid, and last ask data for the security.

Embodiments of the invention provide for: calculating the frequency of trade execution comprising calculating the intensity of inter-arrival trade times based on trade timestamp data for the security; calculating the price movement comprising applying a Brownian motion, a geometric Brownian motion, a Martingale model, a Semimartingale model, or a Monte Carlo model to trade price and trade timestamp data; and calculating the distribution of trade volumes comprising applying a Weibull distribution, a Semimartingale model, or a Monte Carlo model to the trade volume data.

In an embodiment, determining the market state comprises determining a price-volume pair of a best bid or best ask of the security based on trade price and trade volume data.

In an embodiment, calculating the execution probability comprises applying a mathematical transformation to the calculated frequency of trade execution, the calculated price movement, the calculated distribution of trade volumes, and the determined current market state. In an embodiment, calculating the execution probability also comprises applying an integration formula using the calculated frequency of trade execution, the calculated price movement, the calculated distribution of trade volumes, and the determined current market state. In an embodiment, calculating the execution probability comprises applying an adaptive numerical integration routine using the calculated frequency of trade execution, the calculated price movement, the calculated distribution of trade volumes, and the determined current market state.

In various embodiments of the present invention, a computer program product comprises a computer program embodied on at least one computer readable medium, the computer program when executed being operative in performing the functionality described herein.

BRIEF DESCRIPTION OF THE DRAWINGS

The invention is illustrated in the figures of the accompanying drawings, which are meant to be exemplary and not limiting, and in which like references are intended to refer to like or corresponding parts.

DETAILED DESCRIPTION

According to embodiments of the invention, a system, method, and computer program provide an execution probability of a limit order of a given security during a given time period. The system, method, and computer program capture and/or calculate the frequency of trade execution, the time evolution of the price, the time evolution of the trade volume, and the current state of the market, among other parameters, for the given security. The system, method, and computer program generate a probability function based on the parameters corresponding to various time spans, i.e., the execution probability of a limit order within a given time period is provided.

Figure 1:
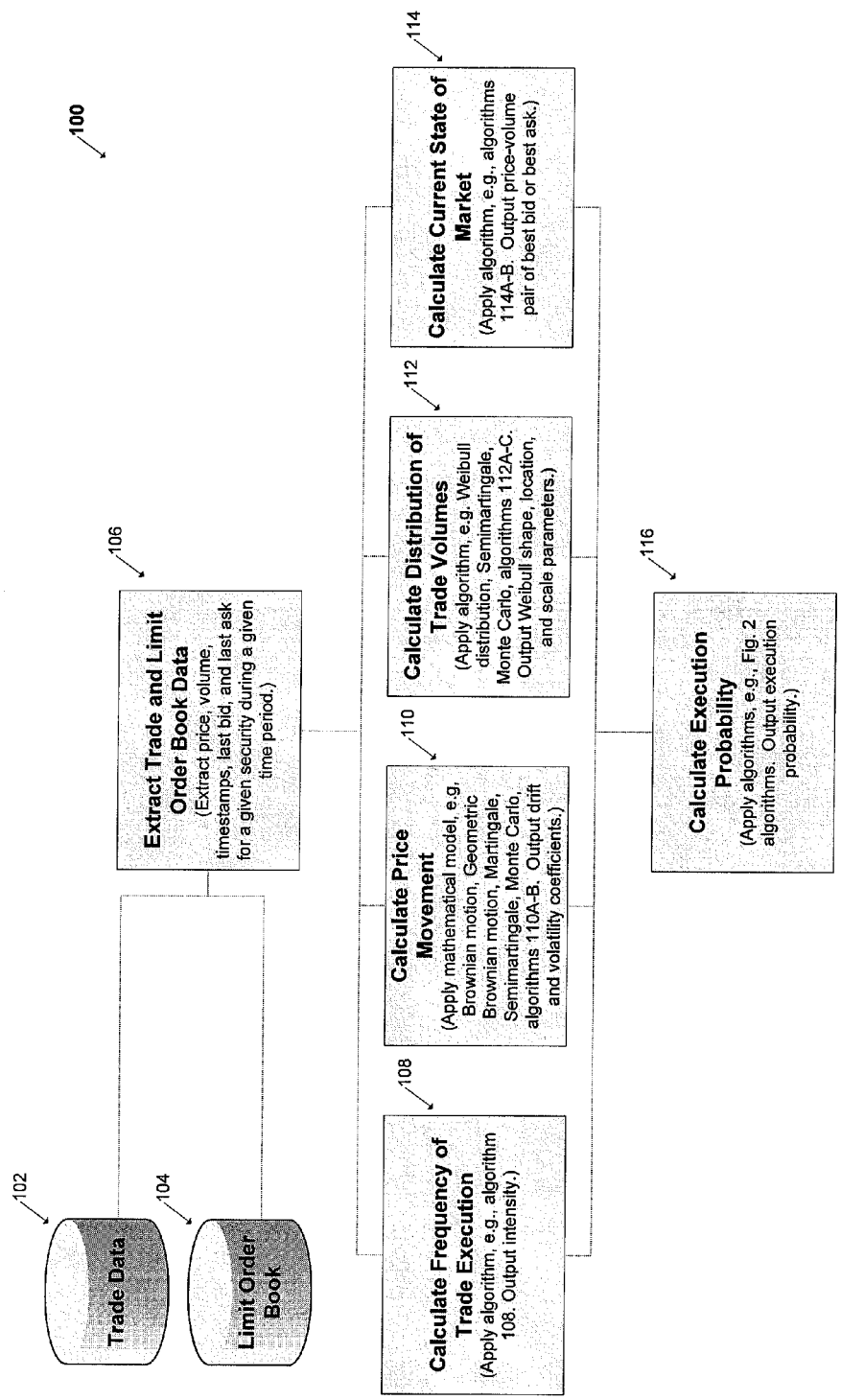
FIG. 1 illustrates a high-level flowchart of calculating the probability of a limit order being executed within a given time period.

FIG. 1 depicts an embodiment of a high-level flow 100 for estimating the probability of a limit order being executed. As populated, database 102 represents a database of trade data for the concerned security. In an embodiment, the database contains the trade price, trade volume, and trade timestamps for completed trades. This data may be obtained in any suitable manner by a programmed computer that received a data stream of market data or tick data and/or accesses a database, and selects and stores relevant data in the database 102.

As populated, database 104 represents a limit order book database. In an embodiment, the database contains ask and bid prices, volume data, and timestamp data. Limit order data may be obtained from one or more entities' order management system (OMS). Firms maintain OMSs for orders of that firm in various securities, and services maintain OMSs for their clients. Limit order data for a given security may be obtained from one or more OMSs in any suitable manner by a programmed computer having access to the concerned OMS(s), which selects the limit order book data and populates database 104.

In block 106, the trade data is extracted from databases 102 and 104 for a given security during a given time period. For example, a programmed computer may download the trade price, trade volume, and trade timestamps for each trade during a five minute period of time as well as the last bid price (if the order is a buy order) or last ask price (if the order is a sell order) and volume data during the same five minute period.

In blocks 108, 110, and 112 market characteristics related to the trading of the security are captured or calculated by a programmed computer using algorithms such as described herein.

In block 108 the frequency of trade execution, is calculated for the security. In an embodiment, interarrival trade times are independent and identically-distributed exponential random variables. In this embodiment, an intensity parameter is calibrated based on input parameters comprising an array of trade timestamps for the interarrival trade times.

In an embodiment, the following algorithm 108 calibrates the intensity parameter in block 108 based on the input parameters comprising an array of trade timestamps for the interarrival trade times, where t is trade timestamp data and n is the number of trades:

$$\hat{\lambda} = \frac{1}{\frac{(t_2 - t_1) + \ldots + (t_n - t_{n-1})}{n-1}} = \frac{n-1}{t_n - t_1}$$

In an embodiment, the above algorithm is executed in block 108 by the following pseudocode:

$$\text{return } \frac{\text{length}[T] - 1}{T[\text{length}[T]] - T[1]}$$

In block 110 the price movement of the security is calculated. Price movements may follow a certain model, e.g., a Brownian motion, a geometric Brownian motion, Martingale, a Semimartingale, or Monte Carlo. In an embodiment, the drift and volatility parameters are calibrated based on input parameters comprising an array of trade prices and trade timestamps for a given model, e.g., a Brownian motion with a drift.

In an embodiment, the following algorithm 110A calibrates the drift coefficient in block 110 based on the input of an array of trade prices and an array of corresponding trade timestamps, where m is the estimate for the two moments of inter-arrival trade times, p is trade price, and t is trade timestamp data.

$$\hat{\mu} = \frac{M_1}{m_1} = \frac{p_n - p_1}{t_n - t_1}$$

In an embodiment, the following algorithm 110B calibrates the volatility coefficient in block 110 based on the input of an array of trade prices and an array of corresponding trade timestamps, where m is the estimate for the two moments of inter-arrival trade times, p is trade price, and t is trade timestamp data.

$$\hat{\gamma} = \sqrt{\frac{M_2 - \hat{\mu}^2 m_2}{m_1}} = $$

$$\sqrt{\frac{[(p_2 - p_1)^2 + \ldots + (p_n - p_{n-1})^2] - \hat{\mu}^2[(t_2 - t_1)^2 + \ldots + (t_n - t_{n-1})^2]}{t_n - t_1}}$$

In an embodiment, the above algorithms for drift and volatility coefficients are executed in block 110 by the following pseudocode:

$$\text{drift} \leftarrow \frac{P[\text{length}[P]] - P[1]}{T[\text{length}[T]] - T[1]}$$

$$m \leftarrow 0$$
$$M \leftarrow 0$$
for i ← 2 to length[T]
   do m ← m + (T[i] − T[i − 1])²
      M ← M + (P[i] − P[i − 1])²

$$\text{volatility} \leftarrow \sqrt{\frac{M - \text{drift}^2 * m}{T[\text{length}[T]] - T[1]}}$$

return drift, volatility

In block 112, the distribution of trade volumes of the security is calculated. In an embodiment, trade volumes are independent and identically-distributed Weibull random variables. Accordingly, location, scale, and shape Weibull parameters are calibrated based on input parameters comprising an array of trade volumes. More specifically, block 112 takes as input an array of independent and identically-distributed observations of a three-parameter Weibull distribution and returns, as output, the estimates for the location, scale, and shape parameters.

In an embodiment, the following algorithm 112A calibrates the shape parameter in block 112 where N is the number of sample data:

$$\log\left(\frac{\Gamma\left(1 + \frac{2}{\text{shape}}\right)}{\Gamma\left(1 + \frac{1}{\text{shape}}\right)^2} - 1\right) - \log\left(1 - N^{-\frac{1}{\text{shape}}}\right) - \log a = 0$$

In an embodiment, the following algorithm 112B calibrates the location parameter in block 112, where N is the number of sample data and minimum is the minimum trade volume:

$$\frac{N^{\frac{1}{\text{shape}}} \times \text{minimum} - m_1}{N^{\frac{1}{\text{shape}}} - 1}$$

In an embodiment, the following algorithm 112C calibrates the scale parameter in block 112, where N is the number of sample data and minimum is the minimum trade volume:

$$\frac{N^{\frac{1}{\text{shape}}}(m_1 - \text{minimum})}{\left(N^{\frac{1}{\text{shape}}} - 1\right)\Gamma\left(1 + \frac{1}{\text{shape}}\right)}$$

In an embodiment, the above algorithms for calibrating the shape, location, and scale coefficients are executed in block 112 by the following pseudocode:

$$m \leftarrow \text{mean}[A]$$

$$\text{skewed Var} \leftarrow \frac{\text{var}[A] * \text{length}[A]}{\text{length}[A] - 1}$$

-continued $$s \leftarrow \min[A]$$

$$a \leftarrow \frac{\text{skewed Var}}{(m - s)^2}$$

shape ← DEKKER-BRENT($W_{BLCALIB}(x, a, \text{length}[A])$, 1)

$$\text{location} \leftarrow \frac{\text{length}[A]^{\frac{1}{\text{shape}}} * s - m}{\text{length}[A]^{\frac{1}{\text{shape}}} - 1}$$

$$\text{scale} \leftarrow \frac{\text{length}[A]^{\frac{1}{\text{shape}}} * (m - s)}{\left(\text{length}[A]^{\frac{1}{\text{shape}}} - 1\right) * \Gamma\left(1 + \frac{1}{\text{shape}}\right)}$$

return location, scale, shape

In block 114, the current state of the market is calculated based on the price-volume pair of an order. In an embodiment, in a buy order, the current state is defined as algorithm 114A comprising the price-volume pair of the latest ask price and the latest ask volume. In an embodiment, in a sell order, the current state is defined as algorithm 114B comprising the price-volume pair of the latest bid price and the latest bid volume.

In an embodiment, the above algorithms for calibrating the price-volume pairs are executed in block 114 by the following pseudocode:

```
if orderType == "Buy"
    then return askPrice[length[askPrice]], askVolume[length[askVolume]]
    else if orderType == "Sell"
        then return bidPrice[length[bidPrice]],
             bidVolume[length[bidVolume]]
        else   error "order type not found"
```

The parameters calculated in blocks 108, 110, 112, and 114 are received in block 116 as input to the execution probability algorithms. The algorithms produce, as output, a probability function corresponding to various time spans, i.e., the execution probability of a limit order within a given time period, e.g., the next two minutes, based on the input parameters.

Figure 2:
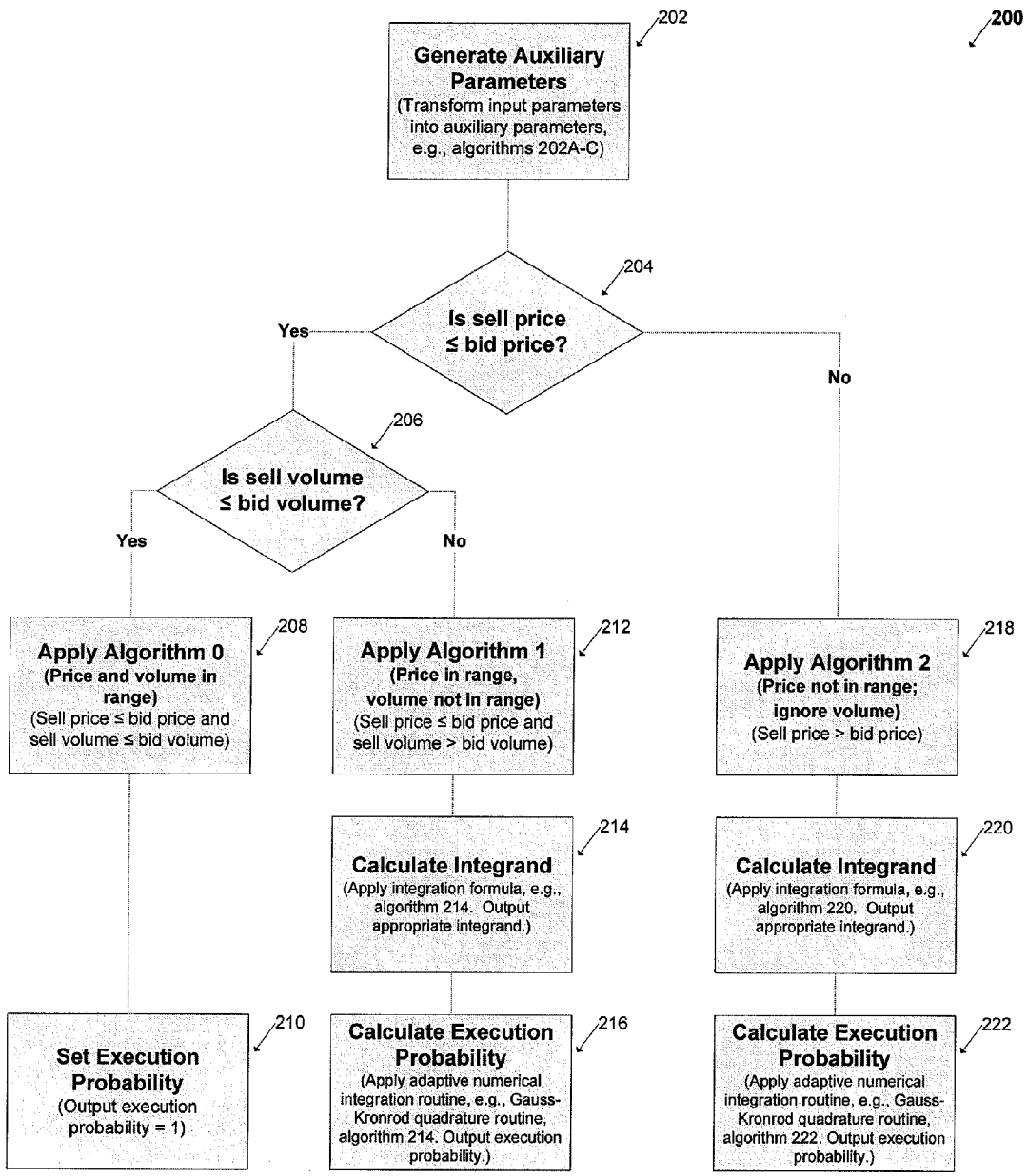
FIG. 2 illustrates a flow of block 116 of FIG. 1 which receives input parameters from blocks 108, 110, 112, and 114 of FIG. 1 and calculates the execution probability of a limit order within a given time period.

FIG. 2 illustrates a flow of block 116 of FIG. 1 which receives input parameters from blocks 108, 110, 112, and 114 of FIG. 1 and calculates the execution probability of a limit order within a given time period.

FIG. 2 depicts an embodiment of a flow 200 for calculating the parameters discussed in connection with FIG. 1 for a sell limit order, to which the following description applies. Parameters may be calculated for a buy limit order in a similar fashion. In block 202, input parameters from blocks 108, 110, 112, and 114 of FIG. 1 are transformed into auxiliary parameters to simplify the algorithms prior to final computation of the execution probability and to allow the same set of algorithms to be used in both buy and sell orders, with only the definitions of the auxiliary parameters differing. The auxiliary parameters may be generated by suitable mathematical transformation as can be determined by any person reasonably skilled in the art. In an embodiment, the auxiliary parameters are generated differentials.

In an embodiment, the following algorithms 202A, 202B, and 202C generate the auxiliary parameters in block 202, where x is price, y is volume, t is trade timestamp data, μ is the drift coefficient, and γ is the volatility coefficient:

$$p = \frac{x_b - x}{\sqrt{2t}\,\gamma}$$

$$q = \frac{\mu\sqrt{t}}{\sqrt{2}\,\gamma}$$

$$\theta = \lambda[1 - H(y_b -)]$$

Calculating the execution probability of a limit order within a given time period may be based on any of a series of algorithms to improve the accuracy of the probability result. In an embodiment, the algorithm used for calculating the execution probability of a given limit order is chosen based on price and volume parameters.

In an embodiment, three algorithms are employed for different orders. More specifically, a first algorithm is applied if the sell price of a given security is equal to or below the bid price, and if the sell volume is below or equal to the bid volume. A second algorithm is applied if the sell price of a given security is equal to or below the bid price, and if the sell volume is greater than the bid volume. A third algorithm is applied if the sell price of a given security is greater than the bid price.

To determine which of the three algorithms to apply, in an embodiment, block 204 (FIG. 2) determines whether the sell price of a given security is equal to or below the bid price. If the sell price is indeed below the bid price, the flow progresses to block 206.

In block 206, to further determine which of the three algorithms to apply, in an embodiment, it is determined whether the sell volume of a given security is equal to or below the bid volume. If the sell volume of a given security is equal to or below the bid volume, the flow progresses to block 208.

In an embodiment, the above algorithms for generating the auxiliary parameters and the decisions in blocks 204 and 206 for a sell order may be executed by the pseudocode below, corresponding to FIG. 2, where the orderType is equal to "sell." In the pseudocode below, "op" corresponds to sell price in FIG. 2, and "sp" corresponds to "state price" or bid price in FIG. 2. The flow for an order type equal to "buy" is similar to the flow depicted in FIG. 2, with the inequality and relationships being reversed for buy and offer prices.

--- if orderType == "Buy"

then $p \leftarrow \frac{op - sp}{\sqrt{2*t} * volatility}$, $q \leftarrow \frac{drift*\sqrt{t}}{\sqrt{2} * volatility}$ if (op $\geq$ sp) and (ov $\leq$ sp)
        then formula Type = 0
    else if (op $\geq$ sp) and (ov > sv)
        then formulaType = 1
        else formulaType = 2
else if orderType == "Sell"

then $p \leftarrow -\frac{op - sp}{\sqrt{2*t} * volatility}$, $q \leftarrow \frac{-drift*\sqrt{t}}{\sqrt{2} * volatility}$ if (op $\leq$ sp) and (ov $\leq$ sv)
        then formulaType = 0
    else if (op $\leq$ sp) and (ov > sv)
        then formulaType = 1
        else formulaType = 2
    else error "order type not found"
theta $\leftarrow$ intensity *(1 - $W_{BL3\,CDF}$(location,scale,shape,ov))
return p, q, theta, intType

---

In block 208, where the sell price of a given security has been determined to be equal to or below the bid price and the sell volume has been determined to be equal to or below the bid volume, the execution probability of the order is assumed to be one hundred percent, which is set in block 210 without further calculation.

Returning to block 206, if the sell volume of a given security is greater than the bid volume, the flow progresses to block 212. In block 212, where the sell price of a given security has been determined to be equal to or below the bid price and the sell volume has been determined to be greater than the bid volume, the execution probability of the order is assumed to be less than one hundred percent. More specifically, as the bid volume is below the sell volume, a situation is created where the seller may request that the bidder execute a larger order, thereby affecting the execution probability.

To calculate an execution probability where the sell price of a given security is equal to or below the bid price, but the sell volume is greater than the bid volume, the flow progresses to block 214. In this block, an integration formula is applied using the auxiliary parameters generated in block 202 along with the amount of time by which the order is to be executed, thereby returning the appropriate integrand. The returned integrand will be used to numerically evaluate execution probability in block 216. In an embodiment, the Er f c function, a complementary error function of the C math library, is employed.

In an embodiment, the following algorithm 214 returns the appropriate integrand in block 214, where p, q and $\theta$ are as defined above in algorithms 202A, 202B, and 202C, and t is trade timestamp data:

$$e^{-\theta tx}\left(\frac{e^{-q^2(1-x)}}{\sqrt{\pi(1-x)}} + q\,\text{Erfc}\left(-q\sqrt{1-x}\right)\right)$$

$$\left(\frac{e^{-\frac{p^2}{x}+2pq-q^2 x}}{\sqrt{\pi x}} - qe^{4pq}\text{Erfc}\left(\frac{p}{\sqrt{x}} + q\sqrt{x}\right)\right)$$

In block 216, an adaptive numerical integration routine is applied using the auxiliary parameters generated in block 202 along with the amount of time by which the order is to be executed and along with the integrand calculated in block 214. In an embodiment, the adaptive numerical integration routine comprises the adaptive Gauss-Kronrod quadrature routine. The output of the adaptive numerical integration routine is the execution probability of the limit order based on the given parameters.

In an embodiment, the following algorithm 216 returns the execution probability of the limit order based on the given parameters in block 216, where p, q and $\theta$ are as defined above in algorithms 202A, 202B, and 202C, and t is trade timestamp data:

$$1 - QUAD(INTEGRAND(x, p, q, \theta, t, formulaType), 0, 1) -$$

$$e^{\theta t}\left(1 - \frac{1}{2}Erfc(p-q) - \frac{1}{2}e^{4pq}Erfc(p+q)\right)$$

Returning to block 204 (FIG. 2), if the sell price of a given security is greater than the bid price, the flow progresses to block 218. In such a case, the execution probability of the order is below one hundred percent as the bid price is below the sell price. Accordingly, an execution probability formula computes the probability that the order gets executed within a pre-specified time window.

To calculate an execution probability where the sell price of a given security is greater than the bid price, the flow progresses to block 220. This block applies an integration formula using the auxiliary parameters generated in block 202 along with the amount of time by which the order is to be executed, thereby returning the appropriate integrand. The returned integrand will be used to numerically evaluate execution probability in block 222. In an embodiment, the Er f c function, a complementary error function of the C math library, is employed.

In an embodiment, the following algorithm 220 returns the appropriate integrand in block 220, where p, q and θ are as defined above in algorithms 202A, 202B, and 202C, and t is trade timestamp data:

$$e^{-\theta tx}\left(\frac{e^{-\frac{p^2}{1-x}+2pq-q^2(1-x)}}{\sqrt{\pi(1-x)}} + qe^{4pq}Erfc\left(-\frac{p}{\sqrt{1-x}} - q\sqrt{1-x}\right)\right)$$

$$\left(\frac{e^{-q^2 x}}{\sqrt{\pi x}} - qErfc(q\sqrt{x})\right)$$

In block 222, an adaptive numerical integration routine is applied using the auxiliary parameters generated in block 202 along with the amount of time by which the order is to be executed and the integrand calculated in block 220. In an embodiment, the adaptive numerical integration routine comprises the adaptive Gauss-Kronrod quadrature routine. The output of the adaptive numerical integration routine is the execution probability of the limit order based on the given parameters.

In an embodiment, the following algorithm 222 returns the execution probability of the limit order based on the given parameters in block 222, where p, q and θ are as defined above in algorithms 202A, 202B, and 202C, and t is trade timestamp data:

$$-QUAD(INTEGRAND(x, p, q, \theta, t, formulaType), 0, 1) +$$

$$\frac{1}{2}Erfc(-p+q) + \frac{1}{2}e^{4pq}Erfc(-p-q)$$

Figure 3:
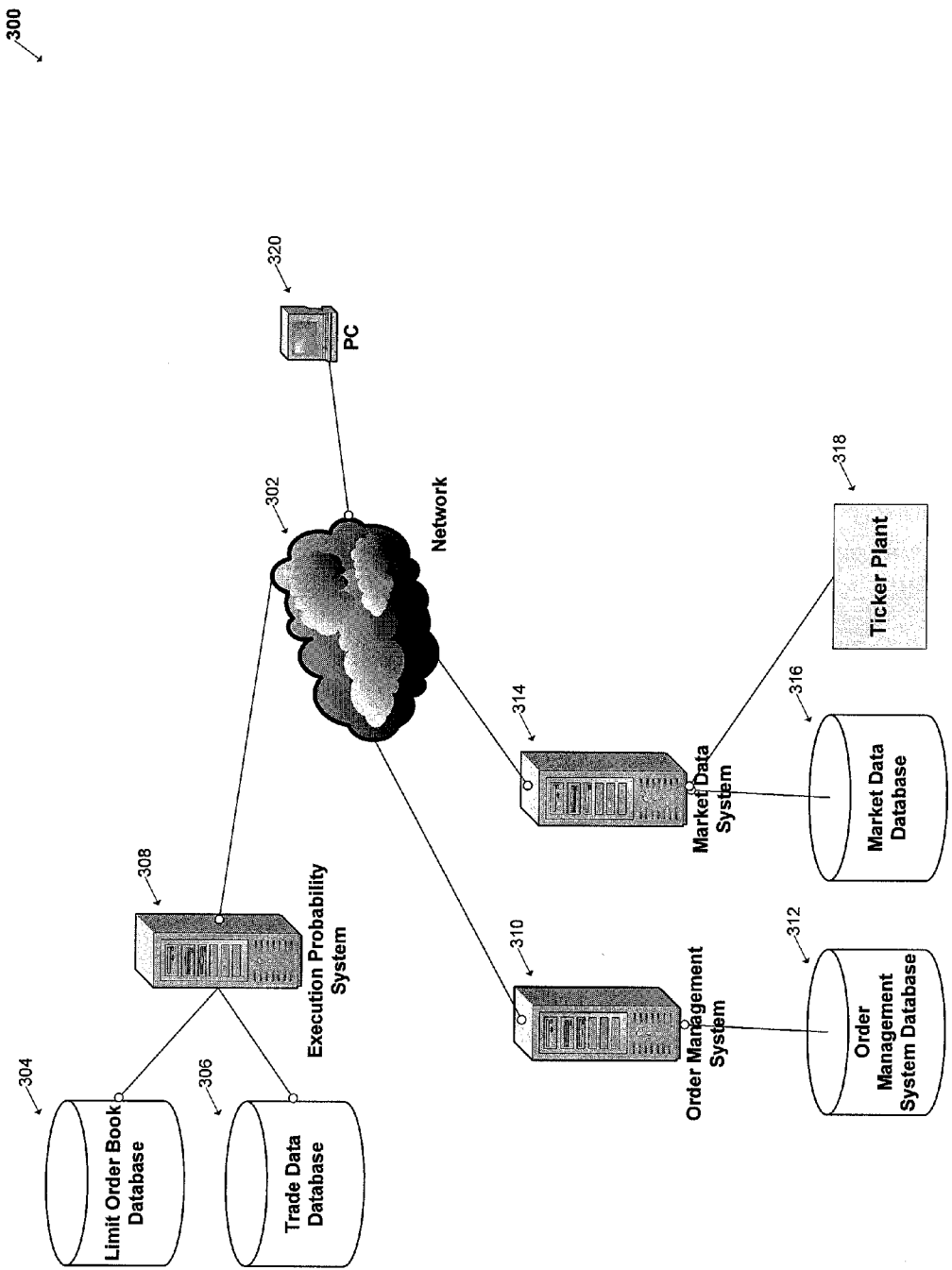
FIG. 3 depicts a block diagram of a computer system according to an embodiment of the invention for calculating the probability of a limit order being executed within a given time period.

FIG. 3 illustrates a computer system 300 for implementing the functionality described herein. Order management system database 312 feeds order management system 310. Market data database 316 and ticker plant 318 feed market data system 314. Execution probability system 308 receives data from order management system 310 comprising at least one computer and market data system 314 comprising at least one computer and stores the extracted data in limit order book database 304 and trade data database 306. Execution probability system 308 generates execution probabilities and forwards the execution probability data to computer 320, which may be a personal computer, a financial terminal, or a web server. Computer 320 may also be used to manage execution probability system 308. Limit order book database 304, trade data database 306, order management system database 312, market data database 316, ticker plant 318, order management system 310, market data system 314, execution probability system 308, and computer 320 may be connected via network connection 302 which may be any type of network system such as a local network, wide area network, or the Internet. Other arrangements of computer hardware and computer architecture may be used to collect, calculate, and store data, generate visual representations, and provide reports.

In various embodiments of the present invention, a computer program product comprises a computer program embodied on at least one computer readable medium, the computer program when executed being operative in performing the functionality described herein.

While the invention has been described and illustrated in connection with embodiments, many variations and modifications as will be evident to those skilled in this art may be made without departing from the spirit and scope of the invention as defined by the claims, and the invention is thus not to be limited to the precise details of methodology or construction set forth above as such variations and modifications are intended to be included within the scope of the invention as defined by the claims.

We claim:

1. A system for providing the execution probability of a limit order of at least one financial interest, the system comprising:
    at least one database configured to store financial trade data of the at least one financial interest;
    at least one computer configured to execute programming stored on a storage medium or media to perform the method comprising:
        calculating a frequency of trade execution of the at least one financial interest based on financial trade data stored in the at least one database;
        calculating a price movement of the at least one financial interest based on financial trade data stored in the at least one database;
        calculating a distribution of trade volumes of the at least one financial interest based on financial trade data stored in the at least one database;
        determining a current market state of the at least one financial interest based on financial trade data stored in the at least one database; and
        calculating an execution probability of a limit order of the at least one financial interest within a given time period based on the calculated frequency of trade execution, the calculated price movement, the calculated distribution of trade volumes, and the determined current market state.

2. The system of claim 1, wherein the financial trade data stored in the at least one database comprises one or more of trade price, trade volume, trade timestamp, last bid, and last ask data for the at least one financial interest.

3. The system of claim 1, wherein calculating the frequency of trade execution comprises calculating the intensity of inter-arrival trade times based on trade timestamp data for the at least one financial interest stored in the at least one database.

4. The system of claim 1, wherein calculating the price movement comprises applying a Brownian motion, a geometric Brownian motion, a Martingale model, a Semimartingale model, or a Monte Carlo model to trade price and trade timestamp data stored in the at least one database.

5. The system of claim 1, wherein calculating the distribution of trade volumes comprises applying a Weibull distribution, a Semimartingale model, or a Monte Carlo model to the trade volume data stored in the at least one database.

6. The system of claim 1, wherein determining the current market state comprises determining a price-volume pair of a best bid or best ask of the at least one financial interest based on trade price and trade volume data stored in the at least one database.

7. The system of claim 1, wherein calculating the execution probability comprises applying a mathematical transformation to the calculated frequency of trade execution, the calculated price movement, the calculated distribution of trade volumes, and the determined current market state.

8. The system of claim 1, wherein calculating the execution probability comprises applying an integration formula using the calculated frequency of trade execution, the calculated price movement, the calculated distribution of trade volumes, and the determined current market state.

9. The system of claim 1, wherein calculating the execution probability comprises applying an adaptive numerical integration routine using the calculated frequency of trade execution, the calculated price movement, the calculated distribution of trade volumes, and the determined current market state.

10. A method for providing the execution probability of a limit order for at least one financial interest, implemented by a computer system comprising at least one computer and at least one database storing at least financial trade data of at least one financial interest, the method comprising:
the at least one computer calculating a frequency of trade execution of the at least one financial interest based on financial trade data stored in the at least one database;
the at least one computer calculating a price movement of the at least one financial interest based on financial trade data stored in the at least one database;
the at least one computer calculating a distribution of trade volumes of the at least one financial interest based on financial trade data stored in the at least one database;
the at least one computer determining a current market state of the at least one financial interest based on financial trade data stored in the at least one database; and
the at least one computer calculating an execution probability of a limit order of the at least one financial interest within a given time period based on the frequency of trade execution calculated by the at least one computer, the price movement calculated by the at least one computer, the distribution of trade volumes calculated by the at least one computer, and the current market state determined by the at least one computer.

11. The method of claim 10, wherein the financial trade data stored in the at least one database comprises one or more of trade price, trade volume, trade timestamp, last bid, and last ask data for the at least one financial interest.

12. The method of claim 10, wherein calculating the frequency of trade execution comprises the at least one computer at least calculating the intensity of inter-arrival trade times based on trade timestamp data for the at least one financial interest stored in the at least one database.

13. The method of claim 10, wherein calculating the price movement comprises the at least one computer at least applying a Brownian motion, a geometric Brownian motion, a Martingale model, a Semimartingale model, or a Monte Carlo model to trade price and trade timestamp data stored in the at least one database.

14. The method of claim 10, wherein calculating the distribution of trade volumes comprises the at least one computer at least applying a Weibull distribution, a Semimartingale model, or a Monte Carlo model to the trade volume data.

15. The method of claim 10, wherein determining the current market state comprises the at least one computer at least determining a price-volume pair of the best bid or best ask of the at least one financial interest based on trade price and trade volume data stored in the at least one database.

16. The method of claim 10, wherein calculating the execution probability comprises the at least one computer at least applying a mathematical transformation to the calculated frequency of trade execution, the calculated price movement, the calculated distribution of trade volumes, and the determined current market state.

17. The method of claim 10, wherein calculating the execution probability comprises the at least one computer at least applying an integration formula using the calculated frequency of trade execution, the calculated price movement, the calculated distribution of trade volumes, and the determined current market state.

18. The method of claim 10, wherein calculating the execution probability comprises the at least one computer at least applying an adaptive numerical integration routine using the calculated frequency of trade execution, the calculated price movement, the calculated distribution of trade volumes, and the determined current market state.

19. A computer program product comprising a computer usable storage medium having stored therein computer readable code embodied therein for providing the execution probability of a limit order for at least one financial interest based on financial trade data, the computer program product comprising computer readable code configured to cause at least one computer to effect a method comprising:
calculating a frequency of trade execution of the at least one financial interest based on financial trade data;
calculating a price movement of the at least one financial interest based on financial trade data;
calculating a distribution of trade volumes of the at least one financial interest based on financial trade data;
determining a current market state of the at least one financial interest based on financial trade data; and
calculating an execution probability of a limit order of the at least one financial interest within a given time period based on the calculated frequency of trade execution, the calculated price movement, the calculated distribution of trade volumes, and the determined current market state.

20. The product of claim 19, wherein the financial trade data comprises one or more of trade price, trade volume, trade timestamp, last bid, and last ask data for the at least one financial interest.

21. The product of claim 19, wherein calculating the frequency of trade execution comprises the at least one computer at least calculating the intensity of inter-arrival trade times based on trade timestamp data for the at least one financial interest.

22. The product of claim 19, wherein calculating the price movement comprises the at least one computer at least applying a Brownian motion, a geometric Brownian motion, a Martingale model, a Semimartingale model, or a Monte Carlo model to trade price and trade timestamp data.

23. The product of claim 19, wherein calculating the distribution of trade volumes comprises the at least one computer at least applying a Weibull distribution, a Semimartingale model, or a Monte Carlo model to the trade volume data.

24. The product of claim 19, wherein determining the current market state comprises the at least one computer at least determining a price-volume pair of the best bid or best ask of the at least one financial interest based on trade price and trade volume data.

25. The product of claim 19, wherein calculating the execution probability comprises the at least one computer at least applying a mathematical transformation to the calculated frequency of trade execution, the calculated price movement, the calculated distribution of trade volumes, and the determined current market state.

26. The product of claim 19, wherein calculating the execution probability comprises the at least one computer at least applying an integration formula using the calculated frequency of trade execution, the calculated price movement, the calculated distribution of trade volumes, and the determined current market state.

27. The product of claim 19, wherein calculating the execution probability comprises the at least one computer at least applying an adaptive numerical integration routine using the calculated frequency of trade execution, the calculated price movement, the calculated distribution of trade volumes, and the determined current market state.

28. A method for providing the execution probability of a limit order for at least one financial interest, implemented by a computer system comprising at least one computer and a database comprising financial trade data of at least one financial interest, the method comprising:

the at least one computer calculating dynamics in past trading of the at least one interest based at least on past trade data of the at least one financial instrument including prices of past executed trades data of the at least one interest, volumes of past executed trades data of the at least one interest, and frequency of execution of past trades data of the at least one interest; and the at least one computer providing an execution probability within a given future time period of a limit order of the at least one financial interest based on the calculated past trading dynamics and a current market state of the at least one financial interest.

29. The method of claim 28, wherein the past trade data includes frequency of execution of past trades data, and wherein calculating dynamics in past trading comprises calculating an intensity of inter-arrival trade times based on the frequency of execution of past trades data.

30. The method of claim 28, wherein the past trade data includes prices of past executed trades data, and wherein calculating the past price dynamics comprises applying a Brownian motion, a geometric Brownian motion, a Martingale model, a Semimartingale model, or a Monte Carlo model to the prices of past trade data.

31. The method of claim 28, wherein the past trade data includes volumes of past executed trades data, and wherein calculating the past volume dynamics comprises applying a Weibull distribution, a Semimartingale model, or a Monte Carlo model to the volumes of past trade data.

32. The method of claim 28, comprising the at least one computer determining the current market state, wherein determining the current market state comprises determining a price-volume pair of trade data.

33. The method of claim 28, wherein calculating the execution probability comprises the at least one computer at least applying an integration formula using the calculated past trading dynamics.

34. The method of claim 28, wherein calculating the execution probability comprises the at least one computer at least applying an adaptive numerical integration routine using the calculated past trading dynamics.

* * * * *